(12) United States Patent
Hwang

(10) Patent No.: US 7,798,694 B2
(45) Date of Patent: Sep. 21, 2010

(54) THERMAL LAYER, BACKLIGHT UNIT AND DISPLAY DEVICE INCLUDING THE SAME

(75) Inventor: Kab Jin Hwang, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 11/507,531

(22) Filed: Aug. 22, 2006

(65) Prior Publication Data
US 2007/0091636 A1     Apr. 26, 2007

(30) Foreign Application Priority Data

Oct. 24, 2005   (KR) ................ 10-2005-0100342
Feb. 8, 2006    (KR) ................ 10-2006-0012265

(51) Int. Cl.
F21V 8/00       (2006.01)

(52) U.S. Cl. ................ 362/560; 362/580; 362/561

(58) Field of Classification Search ................ 362/623, 362/624, 627, 629, 561, 580, 560, 373; 524/437, 524/441, 413, 403; 349/161, 67
See application file for complete search history.

(56) References Cited

U.S. PATENT DOCUMENTS

| | | | |
|---|---|---|---|
| 3,923,697 A * | 12/1975 | Ellis ........................ 252/506 |
| 4,239,675 A * | 12/1980 | Ferrigno ................. 523/223 |
| 5,170,194 A * | 12/1992 | Kurematsu et al. .......... 353/52 |
| 5,742,366 A | 4/1998 | Imoto |
| 6,835,453 B2 | 12/2004 | Greenwood et al. |
| 6,936,653 B2 | 8/2005 | McElrath et al. |
| 2003/0043586 A1 | 3/2003 | Sagal et al. |
| 2003/0090901 A1 | 5/2003 | Moon |
| 2004/0032725 A1 | 2/2004 | Hseih et al. |
| 2004/0251804 A1 | 12/2004 | McCullough |
| 2005/0014867 A1 | 1/2005 | Gulari et al. |
| 2005/0179352 A1 | 8/2005 | Hayashi et al. |

(Continued)

FOREIGN PATENT DOCUMENTS

CN          2505925 Y        8/2002

(Continued)

OTHER PUBLICATIONS

English version of KR 1999-0075202 A, Oct. 15, 1999.*

*Primary Examiner*—Sharon E Payne
(74) *Attorney, Agent, or Firm*—Birch, Stewart, Kolasch & Birch, LLP

(57) ABSTRACT

Disclosed is a thermal layer, as well as a backlight unit and a display device including the same. A composition for the thermal layer comprises a thermally conductive material, about 10 to 40 parts by weight of a binder based on 100 parts by weight of the thermally conductive material, about 5 to 30 parts by weight of a filler based on 100 parts by weight of the thermally conductive material, and about 5 to 40 parts by weight of a curing agent based on 100 parts by weight of the binder. A backlight unit according to the present invention comprises a light source, a reflector reflecting a light emitted from the light source and the present thermal layer disposed on one surface of the reflector. The thermal layer is formed by applying a mixture of the thermally conductive material, the binder, the filler and the curing agent.

8 Claims, 9 Drawing Sheets
(2 of 9 Drawing Sheet(s) Filed in Color)

U.S. PATENT DOCUMENTS

2005/0254259 A1  11/2005  Yamashita et al.
2005/0265048 A1  12/2005  Wang
2006/0098457 A1   5/2006  Chen et al.

FOREIGN PATENT DOCUMENTS

| | | |
|---|---|---|
| CN | 1580896 A | 2/2005 |
| EP | 0 226 361 A1 | 6/1987 |
| EP | 1029893 A2 | 8/2000 |
| JP | 54143094 A * | 11/1979 |
| JP | 61285241 A | 12/1986 |
| JP | 62207313 A | 9/1987 |
| JP | 63202411 A | 8/1988 |
| JP | 2001031880 A | 2/2001 |
| JP | 2003105108 A | 4/2003 |
| JP | 2004-101693 A | 4/2004 |
| KR | 1999-0075202 A | 10/1999 |
| KR | 10-2003-0032769 A | 4/2003 |
| TW | I235635 | 7/2005 |
| TW | 200716733 | 5/2007 |
| TW | 200717106 | 5/2007 |
| WO | WO-9918581 A | 4/1999 |

* cited by examiner

THERMAL LAYER, BACKLIGHT UNIT AND DISPLAY DEVICE INCLUDING THE SAME

This application claims priority to Korean patent application No. 10-2005-0100342 filed on Oct. 24, 2005, and No. 10-2006-0012265 filed on Feb. 8, 2006, under 35 U.S.C. §119, the entire contents of which are herein incorporated by reference.

BACKGROUND OF THE INVENTION

1. Field of the Invention

The present invention relates to a thermal layer, a backlight unit and a display device including the same. Particularly, the present invention relates to a thermal layer capable of improving the temperature character of a display device, as well as a backlight unit and a display device including the same.

2. Description of the Related Art

A Liquid Crystal Display device hereinafter, referred to as a "LCD device") is an electrical device which changes electrical data generated from many apparatuses into visual data, and transfers them by using variation of liquid crystal transmissivity according to applied voltage.

A LCD device is a device for displaying information, but does not have a light source in itself. Thus, a LCD device needs an extra device to uniformly brighten the entire screen by a light source installed at the rear surface of the LCD device. As such an extra device, a Back Light Unit (hereinafter, referred to as a "BLU") is used to provide light to the screen of the LCD device.

A BLU is classified into either a direct-light type or an edge-light type according to the installed position of a light source. In a direct-light type of BLU, the light source is disposed under the liquid crystal panel, and in an edge-light type of BLU, the light source is disposed on the side of light guiding plate.

An edge-light type of BLU comprises a light source unit, a light guiding plate, a reflector, and an optical film.

The light source unit comprises at least one light source generating light with a predetermined wavelength, and a light source reflector. The light generated from the light source is reflected by the light source reflector, which is made up of reflective material, and the reflector. Then, the reflected light is diffused uniformly through the entire light guiding plate.

The optical film comprises a diffuser, a prism sheet, and a protection sheet.

The function of each element in the optical film is explained as follows.

The light uniformly diffused in the light guiding plate passes through the diffuser. The diffuser diffuses or condenses the light having passed through the light guiding plate so that the brightness is uniform and the viewing angle is wider.

However, the brightness of the light after having passed through the diffuser is remarkably decreased. To solve this problem, a prism sheet is used. The prism sheet refracts the light having passed through the diffuser, and converges the light incident in low angle to the direction substantially perpendicular to the prism sheet so that the brightness is increased within the range of the effective viewing angle.

The protection sheet is disposed on the prism sheet. Thus, the protection sheet prevents the prism sheet from being damaged, and widens the narrowed viewing angle.

A Cold Cathode Fluorescent Lamp (hereinafter, referred to as a "CCFL") is used mainly as the light source of the BLU. As the LCD device emits light by the BLU installed to a liquid crystal panel, the inside temperature of the LCD device increases, and the temperature of the CCFL increases up to 80° C. to 90° C.

Thus, the efficiency of the BLU lowers, and the brightness of the LCD device decreases.

Unlike an edge-light type of BLU, a direct-light type of BLU has a reflector under the light source. In this structure, most heat generated from the light source is transferred to the reflector. The reflector is overheated by the transferred heat, and thus may be deformed.

Also, though it may be different according to the type of BLU, most heat generated from the CCFL is transferred to the liquid crystal panel disposed on the front surface of the BLU, and thus a temperature difference between liquid crystal cells may occur. Such temperature difference between liquid crystal cells causes a difference in response velocity between liquid crystal cells, and thus becomes a cause of brightness difference of the LCD device.

A Plasma Display Panel (hereinafter, referred to as a "PDP") is a light-emitting display device having a structure wherein a plurality of discharge cells are disposed between a pair of glass substrates, and need not have an extra light source unlike a LCD device. But, it is a well-known fact that in a PDP, a discharge cell that is induced to emit light for displaying an image generates heat, whereby the temperature of the PDP increases. That is, the heat generated in the discharge cell is transferred to the glass substrate, but is not transferred in a direction parallel to the panel surface due to the characteristic of glass materials having low thermal conductivity.

Also, the temperature of the discharge cell activated for emitting a light is remarkably increased, but the temperature of the discharge cell not activated is not increased that much. Thus, the temperature of the panel is increased partly in an image-forming area. This temperature difference may induce heat declining of the discharge cell affected thereby.

Besides the LCD device or the PDP described above, such heat problems occur in display devices using an emitting diode or organic electroluminescent devices, and is a factor deteriorating the durability or the display quality of the device.

Thus, there has been a need to develop a way to effectively radiate heat generated in such devices to the outside.

SUMMARY OF THE INVENTION

An object of the present invention is to provide a thermal layer, a backlight unit (BLU) and a display device including the same, which can effectively increase brightness by improving the temperature difference in a panel surface, in order to resolve the above-described problems occurred in display devices.

Another object of the present invention is to provide a thermal layer which can increase brightness by preventing increase in the temperature of a light source, as well as a BLU and a display device including the same.

Another object of the present invention is to provide a thermal layer which can absorb heat transferred to a reflector, as well as a BLU and a display device including the same.

A composition for a thermal layer according to the present invention comprises a thermally conductive material, about 10 to 40 parts by weight of a binder based on 100 parts by weight of the thermally conductive material, about 5 to 30 parts by weight of a filler based on 100 parts by weight of the thermally conductive material and about 5 to 40 parts by weight of a curing agent based on 100 parts by weight of the binder.

A backlight unit according to the present invention comprises a light source, a reflector for reflecting light emitted from the light source and a thermal layer disposed on one surface of the reflector. The thermal layer is formed by applying a mixture comprising a thermally conductive material, about 10 to 40 parts by weight of a binder based on 100 parts by weight of the thermally conductive material, about 5 to 30 parts by weight of a filler based on 100 parts by weight of the thermally conductive material and about 5 to 40 parts by weight of a curing agent based on 100 parts by weight of the binder.

A display device comprises a liquid crystal panel displaying an image by using a light and a backlight unit providing the light to the backside of the liquid crystal display panel. The backlight unit comprises a light source, a reflector for reflecting light emitted from the light source and a thermal layer disposed on one surface of the reflector. The thermal layer is formed with a mixture comprising a thermally conductive material, about 10 to 40 parts by weight of a binder based on 100 parts by weight of the thermally conductive material, about 5 to 30 parts by weight of a filler based on 100 parts by weight of the thermally conductive material and about 5 to 40 parts by weight of a curing agent based on 100 parts by weight of the binder.

The thermal layer, as well as the backlight unit and the display device including the same according to the present invention can increase brightness by improving the temperature difference of the panel surface.

The thermal layer, as well as the backlight unit and the display device including the same according to the present invention can increase brightness by effectively absorbing heat transferred to the reflector and preventing increase in the temperature of the light source.

BRIEF DESCRIPTION OF THE DRAWING

The patent or application file contains at least one drawing executed in color. Copies of this patent or patent application publication with color drawing(s) will be provided by the office upon request and payment of the necessary fee.

DETAILED DESCRIPTION OF THE INVENTION

The present invention will be more clearly understood from the detailed description in conjunction with the following drawings.

Figure 1:
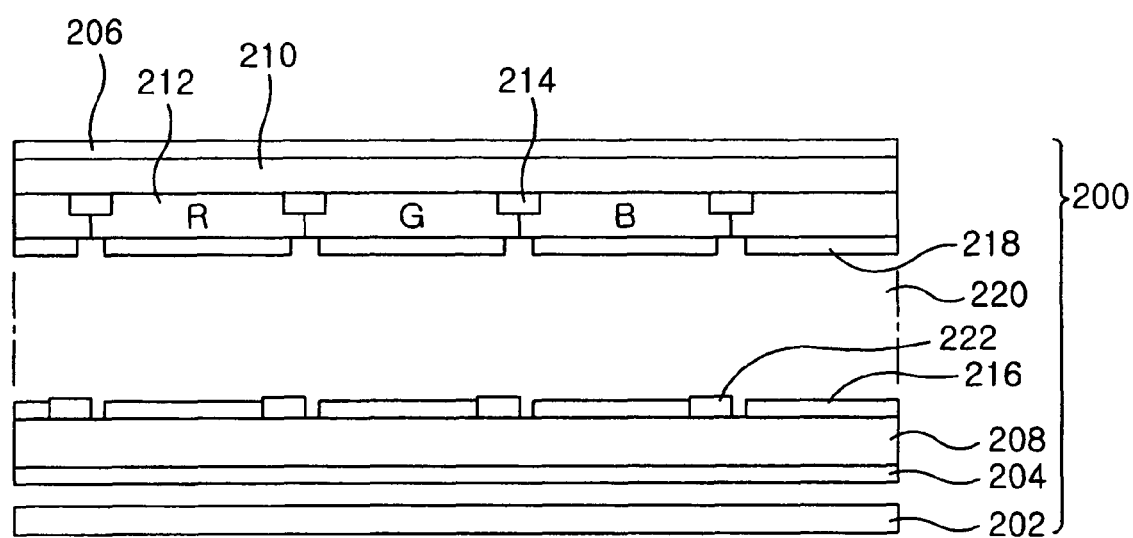
FIG. 1 is a cross-sectional view showing a liquid crystal display device using a backlight unit (BLU) according to one preferred embodiment of the present invention.
Figure 2:
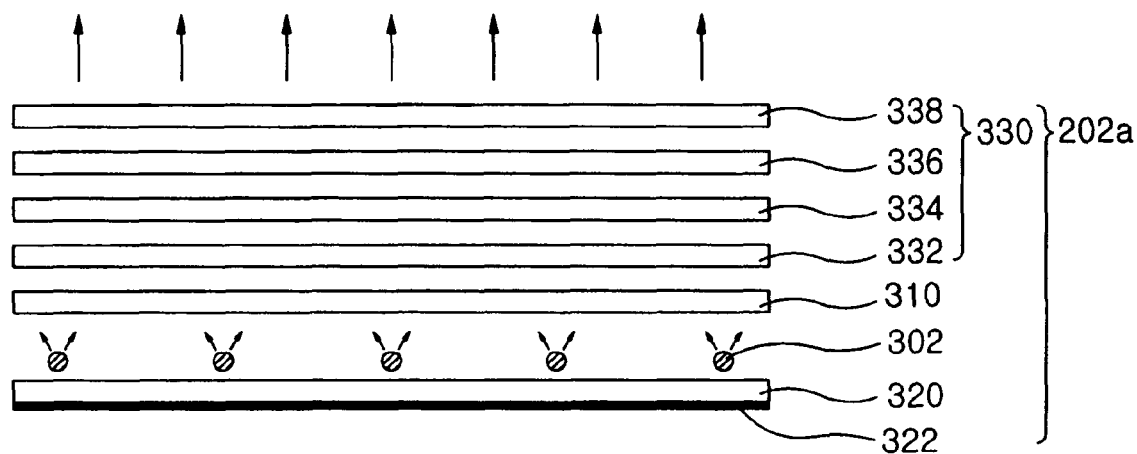
FIG. 2 is a cross-sectional view schematically showing a direct-light type of BLU according to one preferred embodiment of the present invention.
Figure 3:
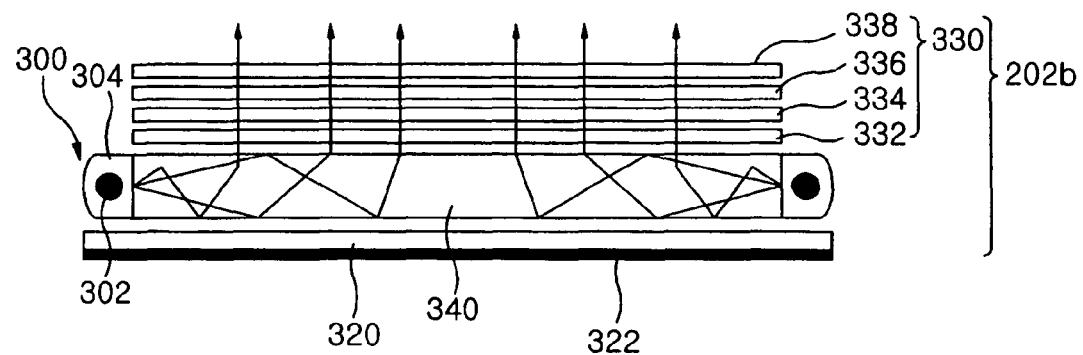
FIG. 3 is a cross-sectional view schematically showing an edge-light type of BLU according to one preferred embodiment of the present invention.

FIG. 1 is a cross-sectional view showing a liquid crystal display device using a backlight unit (BLU) according to one embodiment of the present invention. FIG. 2 is a cross-sectional view schematically showing a direct-light type of BLU according to one embodiment of the present invention. FIG. 3 is a cross-sectional view schematically showing an edge-light type of BLU according to one embodiment of the present invention.

In FIG. 1, a liquid crystal display device (hereinafter, referred as to a "LCD device") comprises a liquid crystal panel 200 (hereinafter, referred as to "LC panel," 200) and a backlight unit 202 (hereinafter, referred as to "BLU," 202).

The LC panel 200 comprises a lower polarizing film 204, an upper polarizing film 206, a lower substrate 208, an upper substrate 210, color filters 212, black matrices 214, pixel electrodes 216, common electrodes 218, a liquid crystal layer 220, and TFT arrays 222.

The color filters 212 include red, green and blue color filters, and generate an image according to red, green or blue in case light is applied thereto.

The TFT arrays 222 switch the pixel electrodes 216 as switching elements.

The common electrodes 218 and the pixel electrodes 216 array molecules of the liquid crystal layer 220 according to a certain voltage applied from the outside.

The liquid crystal layer 220 comprises certain molecules, and the molecules are arrayed according to the voltage difference between the pixel electrodes 216 and the common electrodes 218.

As a result, light provided from the BLU 202 is incident to the color filters 212 according to the molecules arrayed in the liquid crystal layer 220.

The BLU 202 is disposed at a lower part of the LC panel 200, and provides light, for example, white light, to the LC panel 200.

The BLU 202 is classified as either a direct-light type or a edge-light type according to the installed position of the light source. In the direct-light type of BLU, the light source is disposed under the LC panel, and in the edge-light type of BLU, the light source is disposed on the side of a light guiding plate. For the LCD device according to the present invention, both the direct-light type of BLU and the edge-light type of BLU can be used.

First, in FIG. 2, the direct-light type of BLU 202a comprises a light source 302, a transparent plate 310, a reflector 320, a thermal layer 322 and an optical film 330.

The light source 302 may be formed by a plurality of Cold Cathode Fluorescent Lamps (hereinafter, referred to as "CCFL"). A CCFL is a lamp providing a very bright white light.

As the light source 302, a light emitting diode (hereinafter, referred to as "LED") or an electrode fluorescent lamp (hereinafter, referred to as "EEFL") may be used besides the CCFL.

The LED can be formed by the colors red, green and blue, or by white light. In the case of the BLU 202a using a LED as a light source, uniformity of the light can be maintained as well as miniaturization of the BLU 202a and the efficiency of the light can be improved.

The EEFL has better brightness than the CCFL, and is better to operate in parallel because the electrode is external. In particular, the EEFL can reduce the cost for components and weight of the LCD module because it can reduce the number of inverters needed for a conventional light source.

The reflector 320 disposed under the light source 302 reflects the light from the light source 302 towards the transparent plate 310. The reflector 320 according to one embodiment of the present invention can be made by coating silver on a sheet comprising stainless steel, brass, aluminum, polyethylene terephthalate (PET), etc., and coating titanium to prevent change by heat absorption over a long period of time though heat is generated minutely. Also, the reflector 320 according to another embodiment of the present invention can be made by dispersing bubbles on a sheet of plastic like PET.

In addition, the light efficiency may be improved by installing the light source 302 in which a light source reflector (not shown) is disposed under the light source 302, and making the light from the light source 302 incident to the diffuser. The light source reflector is made of highly reflective material, and may be made by coating silver from the surface.

Moreover, heat generated from the light source 302 during the light generation process is transferred to the reflector 320 disposed under the light source 302.

Thus, a thermal layer 322 is formed under the reflector 320 in order to spread the heat transferred to the reflector 320.

The thermal layer 322 will be described later.

The transparent plate 310 transmits the light incident from the light source 302. The transparent plate 310 may comprise polymethylmethacrylate (PMMA), polyethylene terephthalate (PET), polycarbonate (PC), etc. Desirably, the transparent plate 310 comprises polymethylmethacrylate (PMMA).

In the direct-light type of BLU 202a, unlike an edge-light type of BLU, a plurality of light sources 302 are disposed under the LC panel 200, and so the bright lines generated from the light sources 302 appears as a certain pattern on the top of the LC panel 200. The transparent plate 310 has a pattern plays a role of transmitting the light generated from the light sources 302 while removing the bright lines. But, in the BLU 202a according to the present invention, a transparent plate 310 lacking such a pattern may also be used.

The optical film 330 comprises a diffuser 332, a prism sheet 334, a protection sheet 336 and a polarizer 338.

The diffuser 332 diffuses or condenses incident light so that the brightness becomes uniform and the viewing angle becomes wider.

However, the brightness of the light having passed through the diffuser 332 is remarkably decreased. To solve this problem, the prism sheet 334 is used. The prism sheet 334 condenses a part of the light diffused or condensed by the diffuser into the direction of the protection sheet 336, and reflects the other light into the direction of the diffuser 332.

The protection sheet 336 is disposed on the prism sheet 334. Thus, the protection sheet 336 prevents the prism sheet 334 from being damaged, and widens the narrowed viewing angle.

The polarizer 338 reflects a part of the light diffused by the protection sheet 336 in the direction of the light source 302, and provides the remaining light to the LC panel 200. That is, the polarizer 338 plays a role to pass certain polarized light, and reflects other light.

For example, the polarizer 338 passes a longitudinal wave (P wave) in the light diffused by the protection sheet 336, and reflects a transverse wave (S wave) in the direction of the transparent plate 310.

The transverse wave reflected in the polarizer 338 is re-reflected by the reflector 320.

In this case, according to the physical nature of light, the re-reflected light includes the longitudinal wave and the transverse wave.

That is, the transverse wave reflected by the polarizer 338 is changed to light including the longitudinal wave and the transverse wave by being re-reflected in the reflector 320.

Next, the changed light is incident to the polarizer 338 by passing the diffuser 332, the prism sheet 334 and the protection sheet 336.

As a result, the longitudinal wave in the changed light passes the polarizer 338, and the transverse wave is reflected in the direction of the diffuser 332.

Then, the reflected light is re-reflected by the reflector 320, and changed to light including the longitudinal wave and the transverse wave.

On the other hand, the protection sheet 336 and the polarizer 338 can be used individually or in combination, as described above.

The BLU 202a improves the efficiency of light by repeating the above process.

In FIG. 3, the edge-light type of BLU 202b comprises a light source unit 300, a light guiding plate 340, a reflector 320, a thermal layer 322, and an optical film 330.

The light source unit 300 includes one and more light sources 302 and a light source reflector 304.

The light source 302 generates light having a certain wavelength.

The light source 302 may be the CCFL, the LED or the EEFL, as described for the direct-light type of BLU 202a above.

The light source reflector 304 reflects the light from the light source 302 to the light guiding plate 340 and increases the amount of light incident to the light guiding plate 340.

The light generated from the light source 302 is reflected by the light source reflector 304 and the reflector 320. Then, the reflected light is diffused uniformly through the entire light guiding plate 340.

The reflector 320, disposed under the light source unit 300, reflects the light from the light source 302 again to the light guiding plate 340. The reflector 320 can be made by coating silver on a base material comprising a material such as aluminum, etc. to increase the reflection rate, and coating titanium to prevent deformation at the time of heat generation.

Moreover, the heat generated from the light source 302 during the light generation process is transferred to the reflector 320 disposed under the light source 302.

Thus, a thermal layer 322 is formed under the reflector 320 in order to spread the heat transferred to the reflector 320. Also, the reflector and the thermal layer 322 substantially cover the light source unit 300.

The thermal layer 322 will be described below.

The optical film 330 comprises a diffuser 332, a prism sheet 334, a protection sheet 336 and a polarizer 338.

The light diffused uniformly in the light guiding plate 340 passes the diffuser 332. The diffuser 332 diffuses or condenses the light passing the light guiding plate 340 so that the brightness becomes uniform and the viewing angle becomes wider.

Here, the construction and characteristics of the prism sheet 334, the protection sheet 336, and the polarizer 338 may be the same as described above for the direct-light type of the BLU 202a Hereinafter, the light-emitting process of the LCD device will be described.

In FIG. 1, the BLU 202 provides a plane light of white light to the LC panel 200.

Next, the TFT arrays 222 switch the pixel electrodes 216.

Then, certain voltage differences between the pixel electrodes 216 and the common electrodes 218 are applied, resulting in arraying the liquid crystal layer 220 according to each of the red, green and blue color filters.

In this case, while the plane light provided from the BLU 202 is passing the liquid crystal layer 220, the intensity of radiation is controlled, and such controlled plane light is provided to the color filters 212.

As a result, the color filters 212 embody an image with certain gradation.

In detail, the red, green and blue color filter form one pixel, and the pixel embodies an image by combination of light passing the red, green and blue color filters.

Hereinafter, the thermal layer 322 formed on the BLU 202 according to the present invention will be described.

Figure 4:
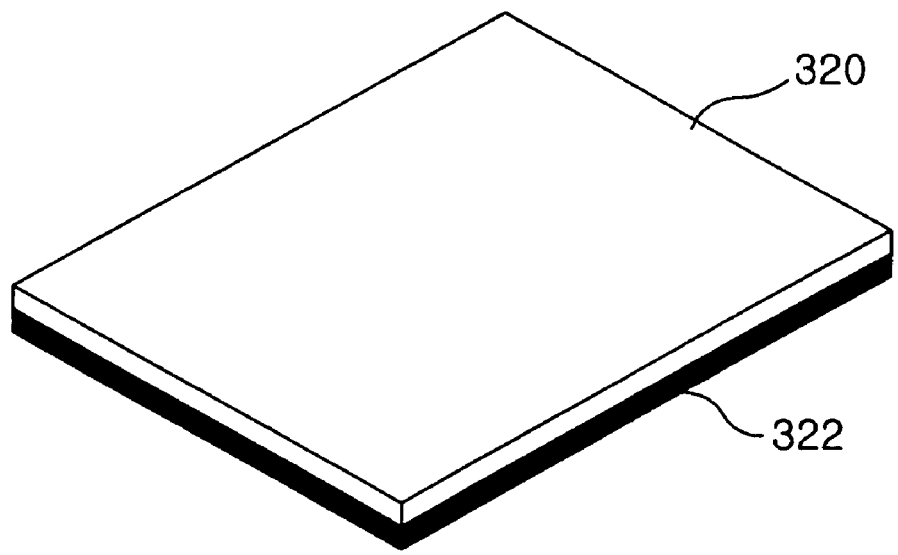
FIG. 4 is a perspective view showing the relation of the reflector and the thermal layer according to one preferred embodiment of the present invention.

FIG. 4 is a perspective view showing relation between the reflector and the thermal layer.

In FIG. 4, the thermal layer 322 is formed on the bottom surface of the reflector 320 to radiate heat transferred to the reflector 320. In detail, the thermal layer 322 is formed by applying a mixture forming the thermal layer 322 onto the bottom surface of the reflector 320 and drying it.

The thermal layer 322 can effectively absorb the heat transferred to the reflector 320 since the thermal conductivity of the thermal layer 322 is superior. Also, the thermal layer 322 can prevent excessive increasing in the temperature of the light source 302 since the thermal layer 322 effectively absorbs the heat generated from the light source 302.

Thus, the light source 302 maintains a temperature that can provide the best efficiency even though the LCD device may be driven for a long time.

The temperature of the surface of the LC panel 200 is partly increased in a cell area emitting light of high brightness since such partial temperature difference causes differences in response velocity of the liquid crystals. The difference in response velocity becomes a cause in decrease of the brightness of the LCD device.

But, in the present invention, the thermal layer 322 formed on the bottom surface of the reflector 320 efficiently absorbs the heat generated in the LC panel 200 since the temperature of the LC panel 200 is uniform.

As shown above, the thermal layer 322 can prevent decrease in the brightness of the LCD device.

The thermal layer 322 is manufactured by using a thermally conductive material. This material is preferably selected so as to have superior thermal conductivity, thus allowing the thermal layer 322 to absorb the heat transferred to the reflector 320 and radiate it to the outside the LCD device. In one embodiment, the thermally conductive material may be a metal powder, such as aluminum powder, copper powder, silver powder or mixtures thereof. In one preferable embodiment, the thermally conductive material is a graphite powder. But, a thermal layer 322 manufactured by using only graphite powder may be easily broken due to the physical characteristics of graphite.

To prevent such a problem, a mixture forming the thermal layer 322 is a mixture comprising a thermally conductive material, such as a graphite powder, as well as a binder, a curing agent and a filler. Also, the mixture can further comprise a dispersing agent and a solvent.

Also, the mixture can further comprise a leveling agent, a wetting agent, a polybasic acid and an acid anhydride.

The present composition comprises a thermally conductive material, about 10 to 40 parts by weight of a binder based on 100 parts by weight of the thermally conductive material, about 5 to 30 parts by weight of a filler based on 100 parts by weight of the thermally conductive material, and about 5 to 40 parts by weight of a curing agent based on 100 parts by weight of the binder.

Desirably, the mixture comprises about 100 parts by weight of a thermally conductive material, about 10 to 40 parts by weight of a binder based on 100 parts by weight of the thermally conductive material, about 5 to 30 parts by weight of a filler based on 100 parts by weight of the thermally conductive material, about 0.1 to 10 parts by weight of a solvent based on 100 parts by weight of the thermally conductive material, about 0.1 to 10 parts by weight of a dispersing agent based on 100 parts by weight of the thermally conductive material, and about 5 to 40 parts by weight of a curing agent based on 100 parts by weight of the binder.

The binder is preferably a material having a superior thermal conductivity and thermal resistance, such as polyester resin, urethane resin, epoxy resin, acryl resin, etc. The binder may be present in an amount of about 10 to 40 parts by weight based on 100 parts by weight of the thermally conductive material, preferably about 20 to 30 parts by weight based upon 100 parts by weight of the thermally conductive material.

In particular, the binder may be at least one selected from the group consisting of polyester resin having carboxyl end-group, polyester resin having hydroxyl end-group, epoxy resin having oxirane functional group, acryl resin having carboxyl end-group, acryl resin having hydroxyl end-group, acryl resin having glycidyl methacrylate (GMA) end-group and urethane resin.

The binder functions to integrate the thermally conductive material particles, such as the graphite powder particles. Therefore, due to the binder, the bonding of thermally conductive material particles is not broken even though external force is exerted on the thermal layer. Consequently, the thermal layer is not broken easily.

For one example, the physical and chemical properties of polyurethane in the material used as the binder are as follows.

Polyurethane is rubber-state elastic body of polymer compounds having urethane bond —OCONH— within the molecule. Recently, the use of polyurethane has been extended to various fields such as urethane rubbers, synthetic fibers, adhesives, paints, urethane forms, automobile bumpers, etc.

Generally, polyurethane is prepared by addition polymerization of a diol (e.g. 1,4-buthandiol, etc.) and a di-isocyanate (diphenylmethane di-isocyanate, etc.). For rubber, a polyether diol such as polyethyleneglycol and polypropyleneglycol, and an aliphatic polyester of a terminal diol are used as diols. As for the form of urethane, polyurethane is usually used in a thermosetting form by adding tri-isocyanate.

The curing agent functions to allow easy drying and curing of the mixture when applied to the reflector 320. The curing agent may be at least one selected from the group consisting of epoxy resin curing agent having oxirane group, TGIC (triglycidyl isocyanurate) curing agent having oxirane group, curing agent having isocyanate group, curing agent having blocked isocyanate, curing agent having carboxyl end-group and aliphatic or aromatic curing agent including at least one of epoxide and anhydride reaction group. The curing agent may be present in an amount of about 5 to 40 parts by weight based on 100 parts by weight of the binder, preferably about 8-12 parts by weight based on 100 parts by weight of the binder.

The filler is a material helping thermal diffusion, and may be at least one selected from the group consisting of $Al_2O_3$, Al, BN and Cu coated with Ag. The filler may be present in an amount of about 5 to 30 parts by weight based on 100 parts by weight of the thermally conductive material, preferably about 10 to 20 parts by weight based on 100 parts by weight of the thermally conductive material.

Cu is easily oxidized when the mixture is prepared. In the case Cu is oxidized, because the performance of the mixture may be lowered, it is desirable that Cu is used by coating with Ag. Desirably, BN is used as the filler.

The dispersing agent is at least one selected from the group consisting of a polyamine amide based material, phosphoric acid ester based material, polyisobutylene, oleic acid, stearic acid, fish oil, ammonium salt of a polycarboxylic acid, sodium carboxymethyl cellulose and mixtures thereof. The dispersing agent may be present in an amount of about 0.1 to 10 parts by weight based on 100 parts by weight of the thermally conductive material, preferably about 0.1 to 1 parts by weight based on 100 parts by weight of the thermally conductive material.

The solvent is one or more selected from the group consisting of methylethylketone, ethanol, xylene, toluene, acetone, trichloroethane, butanol, methylisobutylketone (MIBK), ethylacetate (EA), butylacetate, cyclohexanone, water, propylene glycol mono methyl ether, and mixtures thereof. The solvent may be present in an amount of about 0.1 to 10 parts by weight based on 100 parts by weight of the thermally conductive material.

As the leveling agent, a polyacrylate based material may be used. The leveling agent may be used in an amount of about 0 to 20 parts by weight based on 100 parts by weight of the binder.

The wetting agent is designed to accelerate the wetting function and may be used as a surfactant. Exemplary, but non-limiting wetting agents may be at least one selected from the group consisting of benzene, toluene, dimethylformamide (DMF), butynediol, butendiol, propargyl alcohol, formalin, coumarin, thiourea, carbon acid, acrolein, acetylene derivative, ethylene, saccharin, allyl sulfonate, tri-ethanol amine, hexamethylenetetramine, epichlorohydrin, vanillin, licorice, glue, gelatin(e), glucose, dextrin, arabic gum, β-naphthol, polyacrylamide, iodine compound, polyethylene glycol, cresol sulfonic acid, amine aldehyde group, sodium thiosulfate, carbonate, acetylene acid soda, potassium, turkey red oil, peptone, thiocarbonate, janus green, mercapto compounds, saccharin, BIS (sodium sulphonopropyl disulfides), propylene glycol group, sulfur compounds, and mixtures thereof. The wetting agent may be used in an amount of about 0 to 20 parts by weight based on 100 parts by weight of the binder.

The polybasic acid may any known polybasic acid, such as be phthalic anhydride, maleic anhydride, adipic acid. The polybasic acid may be used in an amount of about 0 to 20 parts by weight based on 100 parts by weight of the binder.

The acid anhydride is $(RCO)_2O$. Exemplary are anhydride dehydrated and condensed one type of carboxylic acid, mixed acid anhydride condensed two type of carboxylic acid, and ring shaped anhydride dehydrated two carboxyl groups from dibasic acid. The acid anhydride may be at least one selected from carbonic acid, sulphuric acid, phosphoric acid, acetic acid, and benzoic acid. The acid anhydride may be used in an amount of about 0 to 20 parts by weight based on 100 parts by weight of the binder.

The thermal layer 322 formed from the above mixture has good thermal conductivity as well as good thermal stability and good mechanical properties (ductility and tensile strength). Thus, it can efficiently absorb the heat of the reflector 320 and radiated the heat away from the device.

As described above, the thermal layer 322 can be used for a plasma display panel (PDP) and an organic electroluminescent device (OELD) as well as the LCD device.

Hereinafter, the results of the trial tests of reflectors 320 formed with the thermal layer 322 according to the inventive embodiment described above.

Figure 5:
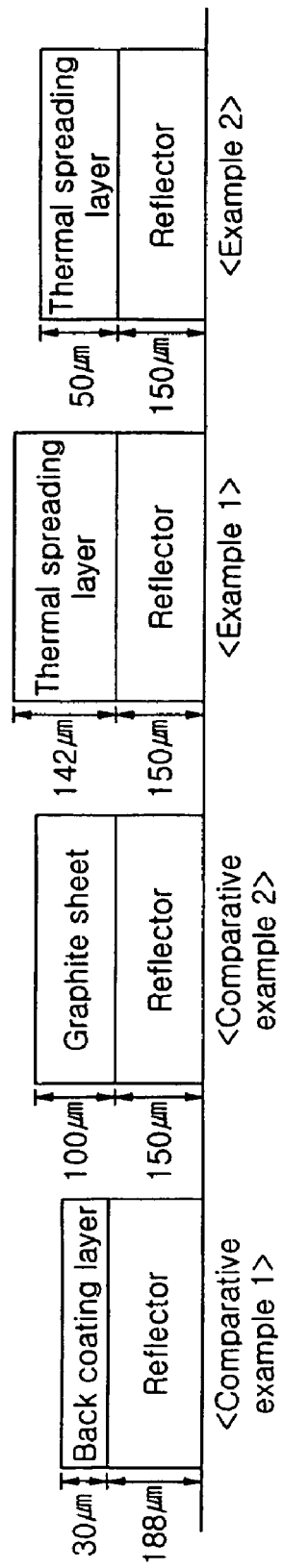
FIG. 5 is a cross-sectional view showing reflectors used in a trial test.

FIG. 5 is a cross-sectional view showing the reflectors used in the trial tests.

In Table. 1, the formation of each of the reflectors and result of the trial tests will be described.

TABLE 1

| Kind of reflector | Thermal absorber | Temperature of cooled light source (° C.) | Brightness character |
|---|---|---|---|
| Comparative Example 1 | RP-10 | | 40.3 | 100 |
| Comparative Example 2 | DUPONT UX-150 | Graphite sheet | 35.9 | 106.3 |
| Example 1 | DUPONT UX-150 | Thermal layer | 34.7 | 108 |
| Example 2 | DUPONT UX-150 | Compressed thermal layer | 34.7 | 107 |

In FIG. 5, Example 1 includes a thermal layer having a thickness of 142 μm under a reflector. The reflector is UX-150 made by DUPONT Inc., having a thickness of 150 μm.

Example 2 includes a thermal layer having a thickness of 50 μm formed by compressing the thermal layer with a roller after forming under the reflector. The reflector is UX-150 made by DUPONT Inc., having a thickness of 150 μm.

Example 1 and Example 2 are not formed with a back coating layer.

The mixture of the thermal layer using in Example 1 and Example 2 comprises about 100 parts by weight of a graphite powder, about 25 parts by weight of a binder based on 100 parts by weight of the graphite powder, about 15 parts by weight of a filler and about 0.5 parts by weight of a dispersing agent based on 100 parts by weight of the graphite powder, and about 10 parts by weight of a curing agent based on 100 parts by weight of the binder.

In Examples 1 and 2, acryl resin is used as the binder, Al is used as the filler, and GSC-041 made by Nipoly is used as the curing agent.

Comparative example 1 is formed with a back coating layer with a thickness of 30 μm under a reflector. The reflector in Comparative example 1 is RP-10, made by SKC and having a thickness of 188 μm.

The back coating layer of Comparative example 1 includes a pigment (e.g., $TiO_2$) acryl resin and curing agent, and is used to prevent exposure of the frame of the BLU to the outside.

Comparative example 2 attaches a graphite sheet having a thickness of 100 μm under a reflector. The reflector is UX-150 made by DUPONT Inc., and has a thickness of 150 μm. Comparative example 2 is not formed with a back coating layer.

First, in the trial test according to the present invention, the reflectors of Example 1, Example 2, Comparative example 1, Comparative example 2 is built into the BLU, and then the LCD device is driven for a predetermined time.

Next, the LCD devices built with each reflector is evaluated with respect to the brightness character, the cooling rate of the temperature of the light source in the BLU, the cooling efficiency of the reflector and the temperature diffusing efficiency.

Figure 6A:
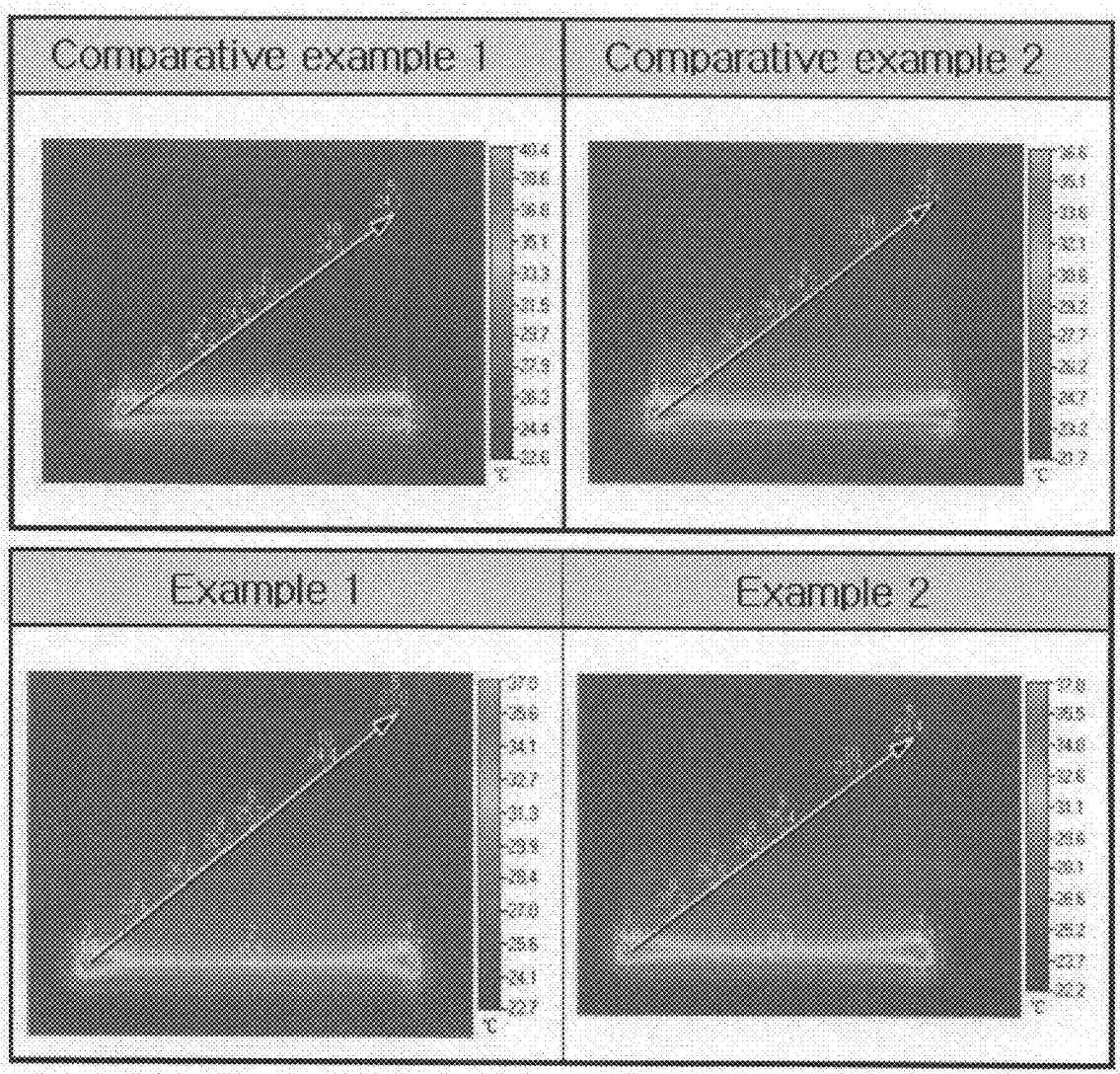
FIG. 6A and FIG. 6B are graphs showing the cooling rate of each reflector. In particular, FIG. 6A consists of graphs showing the temperature distribution of the reflectors, and FIG. 6B consists of graphs showing the temperature of the light sources.
Figure 6B:
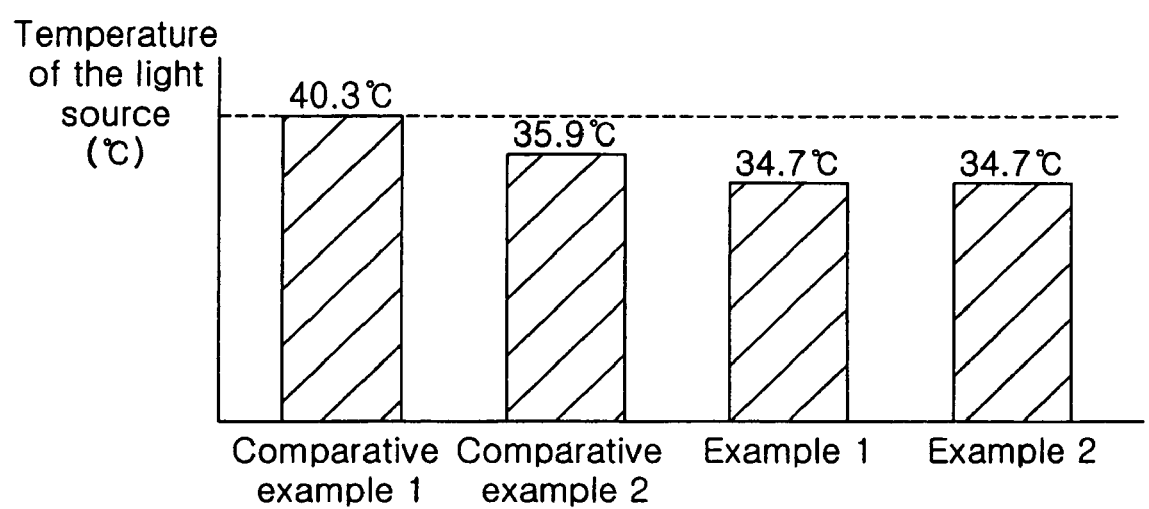

FIG. 6A and FIG. 6B are graphs showing the cooling rate of each reflector, FIG. 6A is a graph showing the temperature distribution of the reflectors, and FIG. 6B is a graph showing the temperatures of the light sources.

First, it will describe result of the trial tests that estimates the radiating rate of the heat transferred from the reflector to outside of the LCD device Based on smaller temperature differences between one part and another part of the reflector, it can be judged that heat transferred to the reflector is absorbed and distributed efficiently.

FIG. 6A is a graph showing the temperature distribution of the light source and the reflector viewed from the top of the BLU, with the light source disposed in the lower end of the horizontal axis. The bar graph at the right side of each vertical axis shows the temperature according to each of the colors distributed the BLU. In the bar graph, higher temperatures are designated with red colors, and lower temperatures are designated with blue colors.

In FIG. 6A, Comparative example 1 shows bright red around the light source, and the reflector, which is the further from the light source, shows more bright blue. But, Example 1 and Example 2 show light red or yellow around the light source, and the reflector shows light blue.

In this manner, the temperature difference between the light source and the reflector is seen to be smaller in Example 1 and Example 2 compared to the greater difference in Comparative example 1. That is, Example 1 and Example 2 exhibit better diffusing of heat generated from the light source to the reflector, and better cooling of the light source.

As shown in FIG. 6B, the temperature of the light source in Comparative example 1 is 40.3° C., the temperature of the light source in Comparative example 2 is 35.9° C., and the temperature of the light source in both Example 1 and Example 2 is 34.7° C.

Comparing the temperature of each of the light sources, the temperature in Example 1 and Example 2 is lower than that in Comparative example 1 and Comparative example 2. That is, Example 1 and Example 2 have a good light source efficiency.

Comparative example 2, having the attached graphite sheet has better heat radiation than Comparative example 1, not having the heat absorber. But, Example 1 and Example 2, formed with the thermal layer, both have better heat radiation than the others.

Due to the thermal layer formed under the reflector of Example 1 and Example 2, these examples have excellent performance in absorbing the heat transferred to the reflector, and radiating heat to the outside of the LCD device.

Next, the results of the trial tests that estimate the diffusion rate of heat transferred to the reflector 320 are described.

Figure 7A:
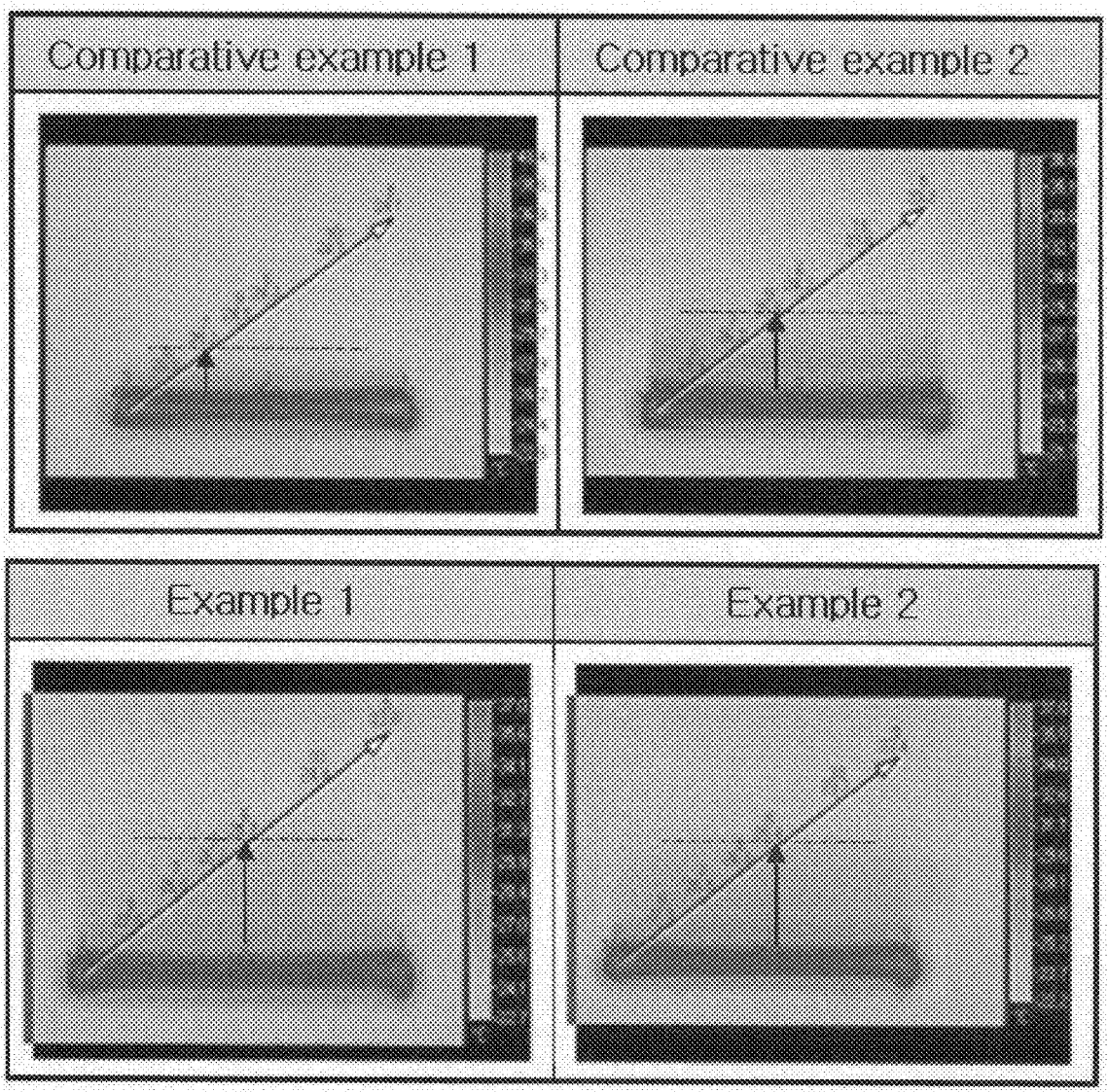
FIG. 7A and FIG. 7B are graphs showing the temperature diffusion rate of each reflector in the results of the trial tests.
Figure 7B:
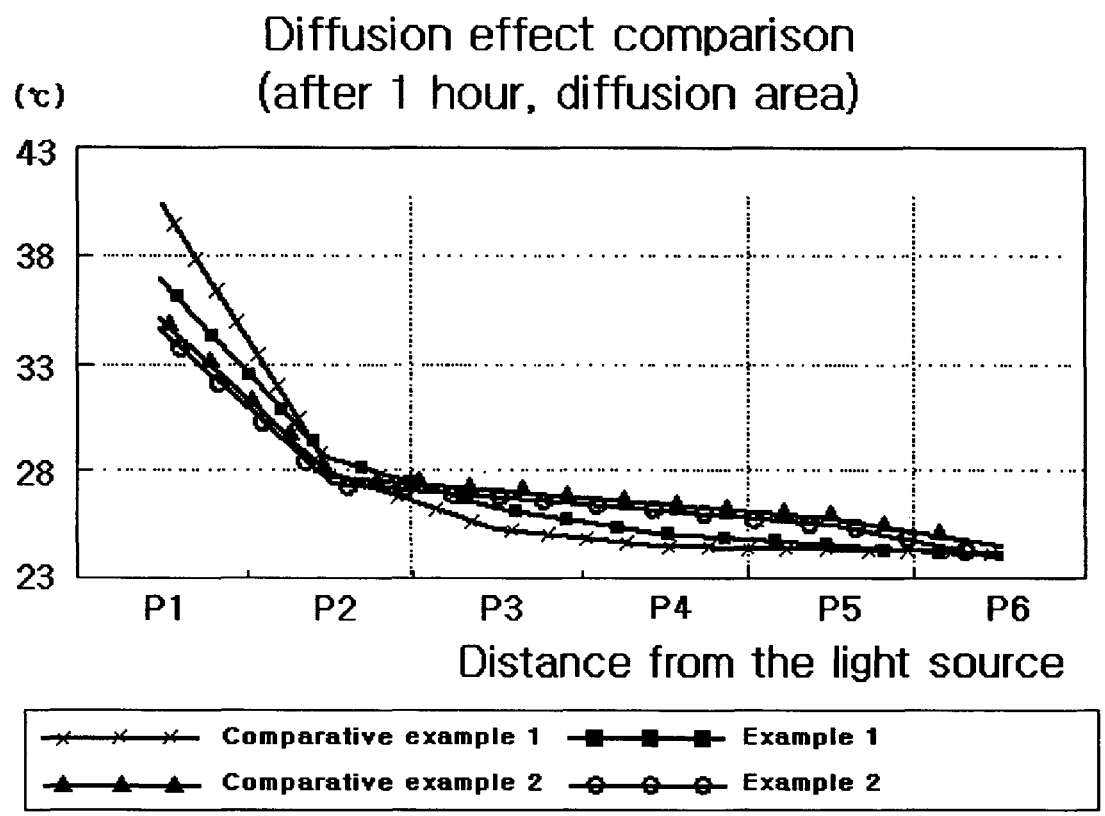

FIG. 7A and FIG. 7B are graphs showing the temperature diffusion rate of each reflector in the results of the trial tests. FIG. 7A and FIG. 7B are graphs showing the temperature distribution of the reflector according to the distance from the light source.

FIG. 7A consists of graphs showing the temperature distribution of the light source and the reflector viewed from the top of the BLU, with the light source disposed in the lower end of the horizontal axis. The bar graphs on the right side of the vertical axis shows the temperature according to each of the colors distributed the BLU. In the bar graph, the higher temperatures are designated with blue colors, and the lower temperatures are designated with yellow colors.

In FIG. 7A and FIG. 7B, a review of the results for Comparative example 1 and Comparative example 2 reveals large temperature differences between areas near the light source and areas far from the light source. Example 1 and Example 2 exhibit smaller temperature differences according to the distance from the light source compared to Comparative example 1 and Comparative example 2.

That is, in Example 1 and Example 2, the thermal layer formed under the reflector efficiently absorbs the heat generated from the LC panel, and transfers the heat generated from one area of the LC panel to surrounding areas so that the temperature of the LC panel is uniform.

Figure 8:
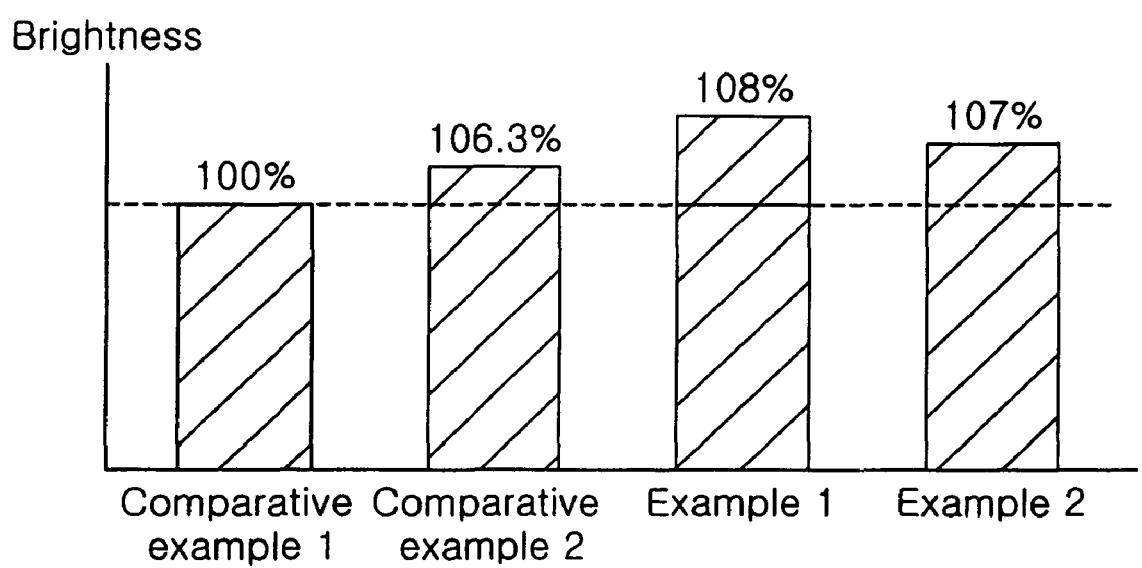
FIG. 8 is a graph showing the brightness character of the LCD device according to each reflector in the results of the trial tests.

FIG. 8 is a graph showing the brightness character of the LCD device according to each of the reflectors in the results of the trial tests.

In FIG. 8, when the brightness of Comparative example 1 is 100%, it can be seen that the brightness of Comparative example 2 is 106.3%, the brightness of Example 1 is 108%, and the brightness of Example 2 is 107%.

That is, the brightness of the Comparative example 2 is better than that of Comparative example 1, and the brightness of Example 1 and Example 2 are better than that of Comparative example 2.

Like above, according to using the reflector formed with the thermal layer, the brightness of the LCD device is improved.

The results of the trial tests, Example 1 and Example 2, formed with the thermal layer 322 under the reflector 320, show good characteristics of cooling, thermal diffusion and brightness.

From the preferred embodiments for the present invention, it should be noted that modifications and variations can be made by a person skilled in the art in light of the above teachings. Therefore, it should be understood that changes may be made for a particular embodiment of the present invention within the scope and spirit of the present invention outlined by the appended claims.

What is claimed is:

1. A backlight unit, comprising:
   a light source for emitting a light;
   a light source reflector surrounding the light source;
   a light guide plate for guiding the light emitted from the light source, the light source being located at least one lateral side of the light guide plate;
   a reflector disposed under the light guide plate for reflecting the light toward the light guide plate; and
   a thermal layer disposed on and in direct contact with one surface of the reflector for absorbing heat transmitted from the light guide plate,
   wherein the thermal layer comprises:
   a thermally conductive material;
   about 10 to 40 parts by weight of a binder based on 100 parts by weight of the thermally conductive material;
   about 5 to 30 parts by weight of a filler based on 100 parts by weight of the thermally conductive material; and
   about 5 to 40 parts by weight of a curing agent based on 100 parts by weight of the binder, and
   wherein the reflector and the thermal layer have a length larger than a length of the light guide plate and are disposed directly below the light source reflector.

2. The backlight unit of claim 1, wherein the thermal layer further comprises
   about 0.1 to 10 parts by weight of a dispersing agent based on 100 parts by weight of the thermally conductive material.

3. The backlight unit of claim 1, wherein the thermal layer further comprises a solvent, and at least one additive selected from the group consisting of a leveling agent, a wetting agent, a polybasic acid and an acid anhydride.

4. A display device, comprising:

a liquid crystal panel displaying an image by using light; and a backlight unit providing light to the backside of the liquid crystal display panel, the backlight unit comprising:

a light source for emitting a light;

a light source reflector surrounding the light source;

a light guide plate for guiding the light emitted from the light source, the light source being located at least one lateral side of the light guide plate;

a reflector disposed under the light guide plate for reflecting the light toward the light guide plate; and a thermal layer disposed on and in direct contact with one surface of the reflector for absorbing heat transmitted from the light guide plate, wherein the thermal layer comprises:

a thermally conductive material;

about 10 to 40 parts by weight of a binder based on 100 parts by weight of the thermally conductive material;

about 5 to 30 parts by weight of a filler based on 100 parts by weight of the thermally conductive material; and about 5 to 40 parts by weight of a curing agent based on 100 parts by weight of the binder, wherein the reflector and the thermal layer have a length larger than a length of the light guide plate and are disposed directly below the light source reflector.

5. The display device of claim 4, wherein the thermal layer further comprises about 0.1 to 10 parts by weight of a dispersing agent based on 100 parts by weight of the thermally conductive material.

6. The display device of claim 4, wherein the thermal layer further comprises a solvent, and at least one additive selected from the group consisting of a leveling agent, a wetting agent, a polybasic acid and an acid anhydride.

7. The display device of claim 4, wherein the thermal layer is formed by applying a mixture of the thermally conductive material, the binder, the filler and the curing agent onto a lower surface of the reflector.

8. The display device of claim 7, wherein the thermal layer is formed by compressing the mixture applied onto the lower surface of the reflector.

* * * * *